UNITED STATES PATENT OFFICE.

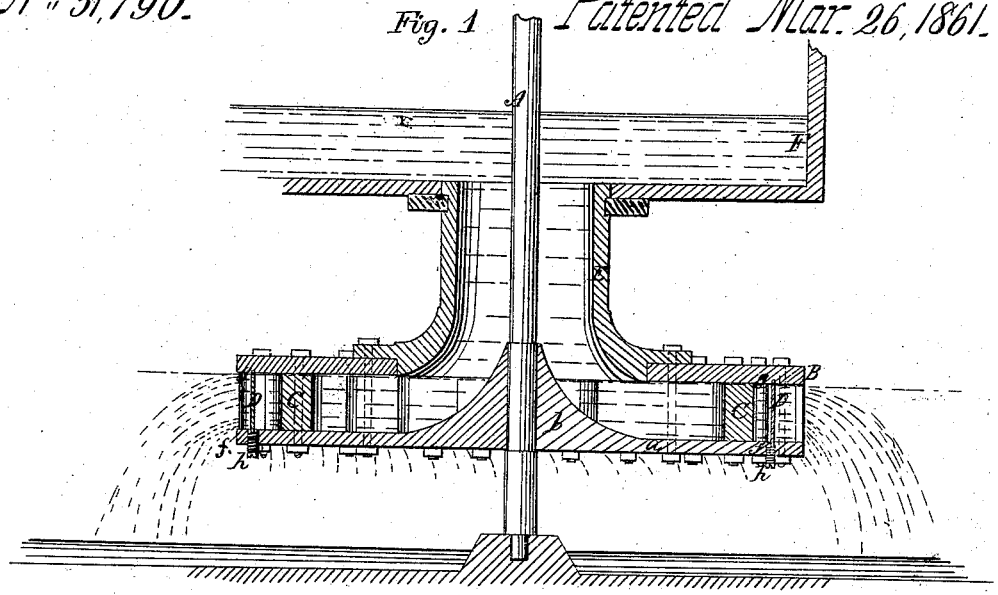
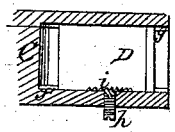
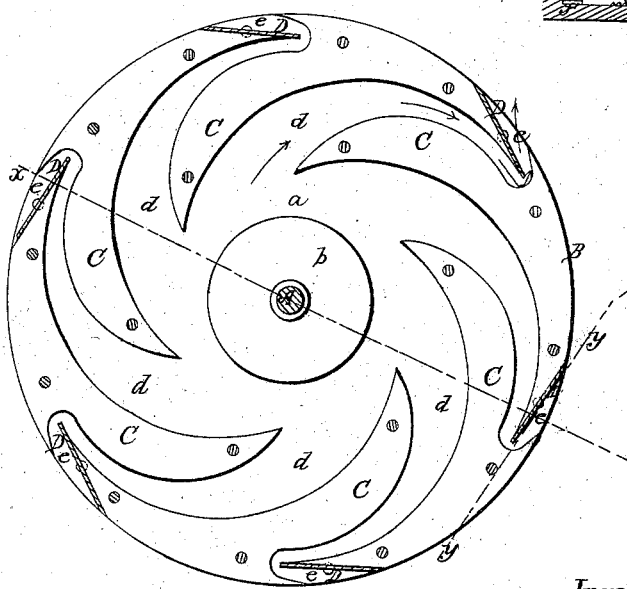

MILTON DILTS, OF COLUMBIA CITY, INDIANA.

WATER-WHEEL.

Specification of Letters Patent No. 31,790, dated March 26, 1861.

*To all whom it may concern:*

Be it known that I, MILTON DILTS, of Columbia City, in the county of Whitley and State of Indiana, have invented a new and Improved Water-Wheel; and I do hereby declare that the following is a full, clear, and exact description of the same, reference being had to the annexed drawings, making a part of this specification, in which—

Figure 1 is a vertical central section of my invention taken in the line $x$, $x$, Fig. 2. Fig. 2 is a horizontal section of the same, taken in the line $y$, $y$, Fig. 1. Fig. 3 is a section of the same taken in the line $z$, $z$, Fig. 2.

Similar letters of reference indicate corresponding parts in the several figures.

To enable those skilled in the art to fully understand and construct my invention I will proceed to describe it.

A represents a vertical arbor or shaft, on the lower part of which the wheel B, is secured. This wheel is formed of a circular plate $a$, at the center of which there is a conical projection $b$, through the center of which the shaft A, passes.

C represents the buckets of the wheel, which are secured between the plate $a$, and an annular plate $c$, which forms the top of the wheel, as shown clearly in Fig. 1. The shape of the buckets C, is shown clearly in Fig. 2, and by referring to this figure it will be seen that the shape of the buckets form issues of a curved form the parts $d$, of which curve gradually from near the base of the conical projection $b$, to points near the periphery of the wheel, and then turn quickly and reach the periphery in opposite directions, the latter part $e$, of the issues being quite short compared with the parts $d$.

The parts $d$, of the buckets gradually diminish in width from their inner to their outer ends, the outer ends being a trifle narrower than the parts $e$.

In the outer parts $e$, of the issues there are placed vertical plates D. These plates have their lower edges fitted in grooves $f$, which are made in the plate $a$, the upper edges of the plates being fitted in grooves $g$, in the under side of plate $c$. The plates D, abut against the outer parts of the buckets C, and consequently are at the inner sides of the parts $e$, of the issues, and the plates are secured in proper position by means of screws $h$, which pass up through the bottom plate $a$, of the wheel, and have their upper edges fitting into notches $i$, at the bottom edges of the plates, as shown clearly in Fig. 3. The upper ends of the screws $h$, are indented so that they may fit into the notches $i$, in the plates.

The plates D, may be so adjusted as to extend more or less across the angles or turns of the issues, and thereby regulate the discharge of the water as may be required.

The upper plate $c$, has a tube E, attached to it. This tube is concentric with the plate $c$, and shaft A, extends upward to the penstock F, as shown clearly in Fig. 1. The lower part of the tube E, is of bell-shape, and conforms to the shape of the conical projection $b$, as shown clearly in Fig. 1.

The operation will be readily seen. The water is admitted down through the tube E, and is deflected outward by the conical projection $b$, and enters the issues as indicated by the blue arrows in Fig. 2, and acts by impact against the curved parts of the buckets, as shown at $j$, the water leaving the wheel in a direction opposite to that in which the wheel rotates. The discharge of the water is regulated by adjusting the plates D, and by regulating the discharge according to the supply, the maximum power of the wheel under varying heads will be obtained without any waste of water.

The water may be admitted at the under side of the wheel instead of at the upper side as described. In the former case the conical projection $b$, would be attached to the upper plate of the wheel, and the tube E, to the lower plate.

I do not claim separately the employment or use of the curved buckets, nor conical projection; but I do claim as new, and desire to secure by Letters Patent, The arrangement of the adjustable slides D with the peculiarly formed buckets C in the manner and for the purposes herein shown and described.

MILTON DILTS.

Witnesses:
JAMES SHEEKLER,
WARREN MASON.